June 28, 1966  N. SCHIMMEL  3,257,747
BADGE AND METHOD OF MAKING SAME
Filed May 31, 1963
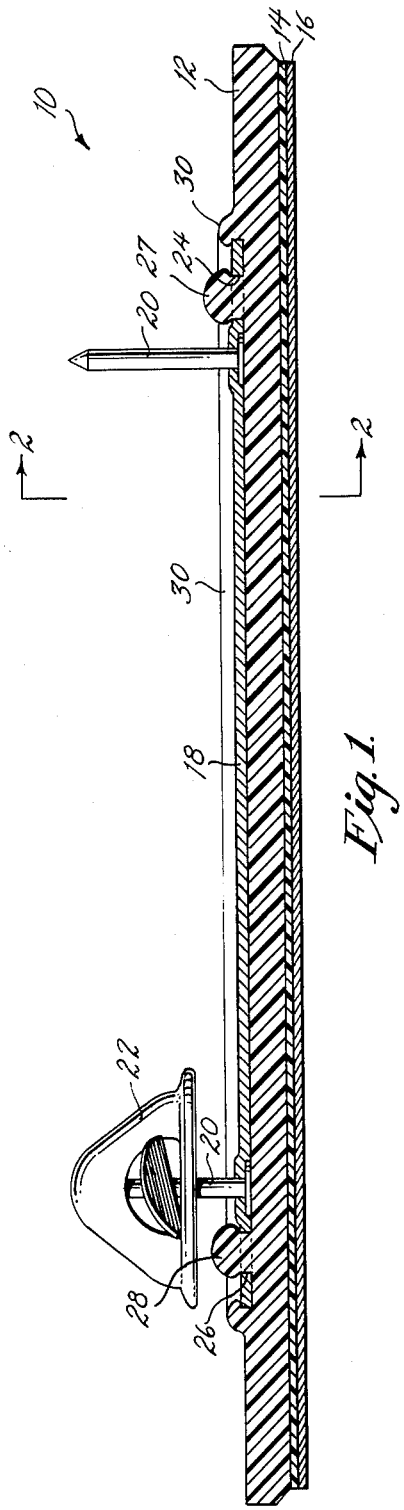
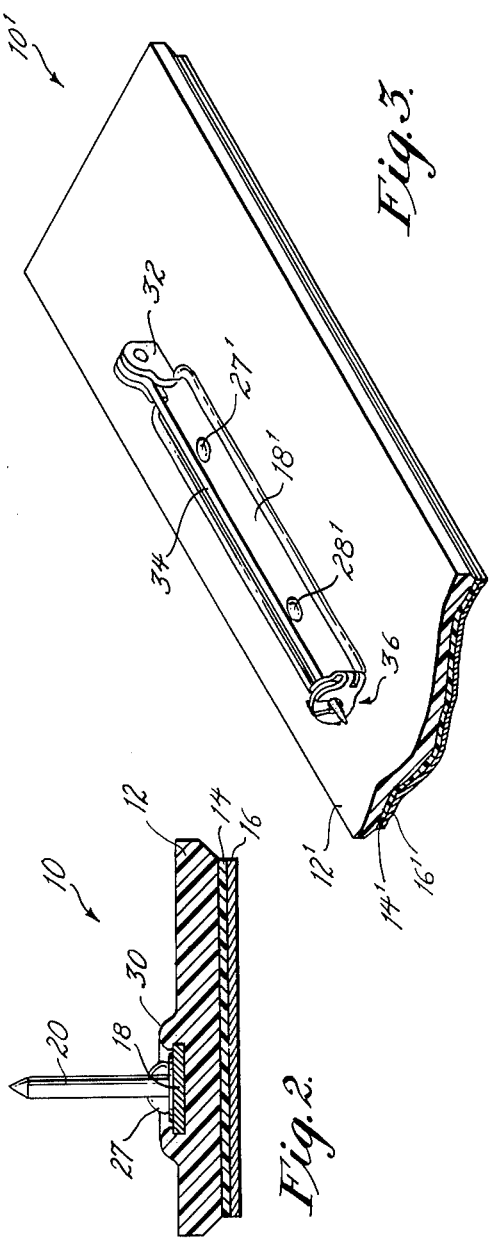
INVENTOR.
NORBERT SCHIMMEL
BY
Arthur H. Seidel
ATTORNEY

United States Patent Office 3,257,747
Patented June 28, 1966

3,257,747
BADGE AND METHOD OF MAKING SAME
Norbert Schimmel, New York, N.Y., assignor to Hermes Plastics, Inc., New York, N.Y., a corporation of New York
Filed May 31, 1963, Ser. No. 284,727
6 Claims. (Cl. 40—1.5)

This invention relates to a badge and a method of making the same.

Badges, brooches, identification devices and the like have been manufactured in a variety of different ways for many years. Heretofore, such badges and the like secured the fastening means to the body of the badge by rivets, clips, prongs on the fastening means, cut-out recesses in the body of the badge, etc. Such arrangements for securing the fastening means to the body of the badge necessitate manufacturing steps and require an increased number of components as compared with the present invention.

The badge of the present invention includes a body portion and a fastening means secured together with a fused joint. The body portion of the badge is preferably a heat fusable plastic material, such as cellulose acetate, any of the acrylics, polystyrene, polyethylene, polyvinyl chlorides, etc. The fastening means is applied with pressure and in a heated condition against the body portion of the badge. The fused plastic material is permitted to flow through holes in the fastening means and permitted to solidify to effect a fused joint therebetween.

As a result of the present invention, the manufacturing process for making badges is materially simplified, badges may be made more economically, and the number of components is reduced to a minimum. While attaining these advantages, the badges of the present invention do not detract from the outward appearance of the badge, and the means for securing the attachment means to the body of the badge is not readily apparent from the front of the badge.

It is an object of the present invention to provide a novel badge and a method for making the same.

It is another object of the present invention to provide a badge wherein the body portion of fusable plastic material is fused to the attachment means for the badge.

It is another object of the present invention to provide a method for making a badge wherein a heated attachment means is applied with pressure against the body portion of a badge made from a fusable plastic material.

It is another object of the present invention to provide a novel badge and method of making the same which is economical, rapid, reliable, and utilizes a minimum number of parts.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a longitudinal sectional view through a badge of the present invention.

FIGURE 2 is a sectional view taken along the line 2—2 in FIGURE 1.

FIGURE 3 is a partial perspective view of a badge in accordance with another embodiment of the present invention.

Referring to the drawing in detail, wherein like numerals indicate like elements, there is shown in FIGURE 1 a badge designated generally as 10.

The badge 10 includes a body portion 12 of heat fusable plastic material including but not limited to the acrylics, cellulose acetate, polystyrene, polyethylene, polyvinyl chloride, etc. The body 12 is a strip of material cut to the desired width and length. During the manufacture of the same, the step of cutting the body 12 to the desired length may be the ultimate step, if desired. A layer 14 of plastic material is joined to one face of the body 12. Layer 14 may be any conventional material having writings thereon or capable of being embossed or otherwise printed to contain any information or ornamental configuratiton. A protective layer of paper 16 having a pressure-sensitive coating is juxtaposed and adheres to the exposed face of the layer 14.

A fastening means is applied to the rear face of the body 12. Such fastening means includes a thin, flat, plate-like section or layer of metal 18 having outwardly projecting prongs 20 at spaced points therealong. The prongs 20 extend through punched holes in metal 18 and the heads of the prongs are soldered or welded in place. Hence, the heads are not visible from above in FIGURE 1. For purposes of illustration, the body 12 may have a thickness of approximately 0.10 inch and the layer of metal 18 may have a thickness of approximately 0.03 inch. In order that the prongs 20 may facilitate the mounting of the badge 10 on a support, conventional spring clips 22 will be provided for each of the prongs 20.

The layer of metal 18 is provided with a pair of holes 24 and 26. Holes 24 and 26 are preferably punched at the same time as the holes for the prongs. Integral projections 27 and 28 of plastic material from the body 12 extend through the holes 24 and 26, respectively. It will be noted that the free end of the projections 27 and 28 terminates in a bead having a diameter greater than the diameter of the holes 24 and 26. The projections 27 and 28 are fused to the layer of metal 18. A ridge 30 of plastic material from the body 12 extends around the periphery of the layer of metal 18.

In constructing the badge 10 of the present invention, the body 12 is supported on any convenient surface below a platen. The attachment means will be supported by the platen and heated by a coil on the platen. Pressure will be applied by the platen to force the heated attachment means against the rear face of the body 12. The heat of the layer of metal 18 and the pressure with which it is applied against the body 12 cause the layer of metal 18 to be embedded in the body 12 so that the upper surface of the layer of metal 18 is substantially flush with the upper surface of the body 12. The melted plastic material of the body 12 forms the ridge 30 and fuses upwardly through the holes 24 and 26 to form the projections 27 and 28. When the fused plastic material of the body 12 has solidified, the attachment means will be joined thereto by a fused joint. The enlarged bead at the free end of the projections 27 and 28 assures that the layer of metal 18 will be retained in a position locked against the body 12. A partial locking effect is also attained by the ridge 30 which overlaps the uppermost surface of the layer of metal 18.

All of the above steps may be accomplished in a very short period of time and may be effected by automatic or semi-automatic equipment. The heating of the body 12 to effect a fused joint is only locally on the uppermost surface immediately adjacent the layer of metal 18. Thus, the heating equipment need not be large or expensive, and the layers 14 and 16 may have been applied previously to the body 12. The body 12 may have previously been cut to the unit lengths which are desired or may be in strip form. If the attachment means are secured to the body 12 which is in strip form, with such attachment means being applied at spaced points therealong, the ultimate step in the method of manufacturing the badge 10 of the present invention would be the step of cutting the strip into unit lengths between adjacent attachment means. In view of the minimum number of parts being utilized, and the simplicity of effecting the mounting of the attachment means on the body 12, the badge 10 of the present invention may be made faster and more economically than badges proposed heretofore.

In FIGURE 3, there is illustrated another embodiment of the present invention designated generally as 10'. The badge 10' is identical with the badge 10 except as will be made clear hereinafter. Hence, corresponding primed numerals are provided in FIGURE 3 for the corresponding elements of badge 10.

Badge 10' differs from badge 10 in the provision of a different type of attachment means. The attachment means of badge 10' includes a layer of metal 18'. On one end of the layer of metal 18', there is provided an integral rotary support 32. Support 32 includes a pair of integral ears bent upwardly from the plane of the layer of metal 18' and rotatably support one end of a stick-pin 34. The free end of the stick-pin 34 is retained in a closed disposition by a conventional rotary latch 36 which is integral with the other end of the layer of metal 18'. Holes corresponding to holes 24 and 26 are provided in the layer of metal 18' between the support 32 and the latch 36.

The present invention may be embodied in other specific forms without departing from the spirit or essential attributes thereof and, accordingly, reference should be made to the appended claims, rather than to the foregoing specification as indicating the scope of the invention.

I claim:

1. A badge, brooch, or the like comprising a layer of heat fusible polymeric plastic material, a flat plate-like section, said section having an outer periphery and at least one hole therethrough, a heat-fused joint between one face of said layer of material and said flat plate-like section, said heat-fused joint comprising an integral projection of said layer of material extending around at least a portion of said outer periphery and fused thereto in overlapping relation, said heat-fused joint further comprising an integral projection of said layer of material extending through said hole and fused to said section in overlapping relation, said projection having an enlarged head at its end remote from said layer of material, said head having a diameter greater than the diameter of said hole, and means on said section for attaching the section and layer of material as a unit to a support.

2. A badge in accordance with claim 1, wherein said flat plate-like section includes two holes therethrough and said heat-fused joint comprises an integral projection of said layer of material extending through each of said holes and fused to said section in overlapping relation.

3. A badge in accordance with claim 1 wherein said means for attaching includes prongs extending from said flat plate-like section, with said section being made of metal, and a separate clip for each prong.

4. A badge in accordance with claim 1 wherein said flat plate-like section is metal having a pin rotatably mounted at one end thereof, a selectively operable latch for the pin mounted at the other end of said plate-like section.

5. A badge in accordance with claim 1 including a second layer of plastic material juxtaposed to and joined to a surface of said fusable plastic material, said last-mentioned surface being opposite to the surface of said fusable plastic material to which said plate-like section is joined, and a protective layer for said second layer of plastic material.

6. A method of making a badge, brooch or the like comprising the steps of providing a layer of fusable plastic material, providing an attachment means having a flat plate-like section, providing at least one hole through said section, heating said section, applying said heated section against a surface of said fusable plastic material, causing only local heating of the fusable plastic material by said heated section to locally melt the fusable plastic material, and effecting a fused joint between said section and said fusable plastic material by enabling the melted plastic material to solidify in a manner whereby some of the melted plastic material will extend through the hole in the section.

References Cited by the Examiner

UNITED STATES PATENTS

| | | | |
|---|---|---|---|
| 1,179,081 | 4/1916 | Denne | 40—135 |
| 1,999,786 | 4/1935 | Rosenblum | 40—1.5 |
| 2,720,681 | 10/1955 | Danielson | 18—59 |
| 2,902,782 | 9/1959 | Coleman | 40—1.5 |
| 2,925,625 | 2/1960 | Souza | 18—61 |

FOREIGN PATENTS

| | | |
|---|---|---|
| 868,861 | 3/1953 | Germany. |
| 116,632 | 9/1926 | Switzerland. |

EUGENE R. CAPOZIO, *Primary Examiner.*

JEROME SCHALL, *Examiner.*

WENCELSO J. CONTRERAS, *Assistant Examiner.*